Oct. 5, 1937.  L. D. SOUBIER  2,094,624
METHOD OF AND APPARATUS FOR PRODUCING HOLLOW GLASS ARTICLES
Original Filed Feb. 9, 1934   6 Sheets—Sheet 2
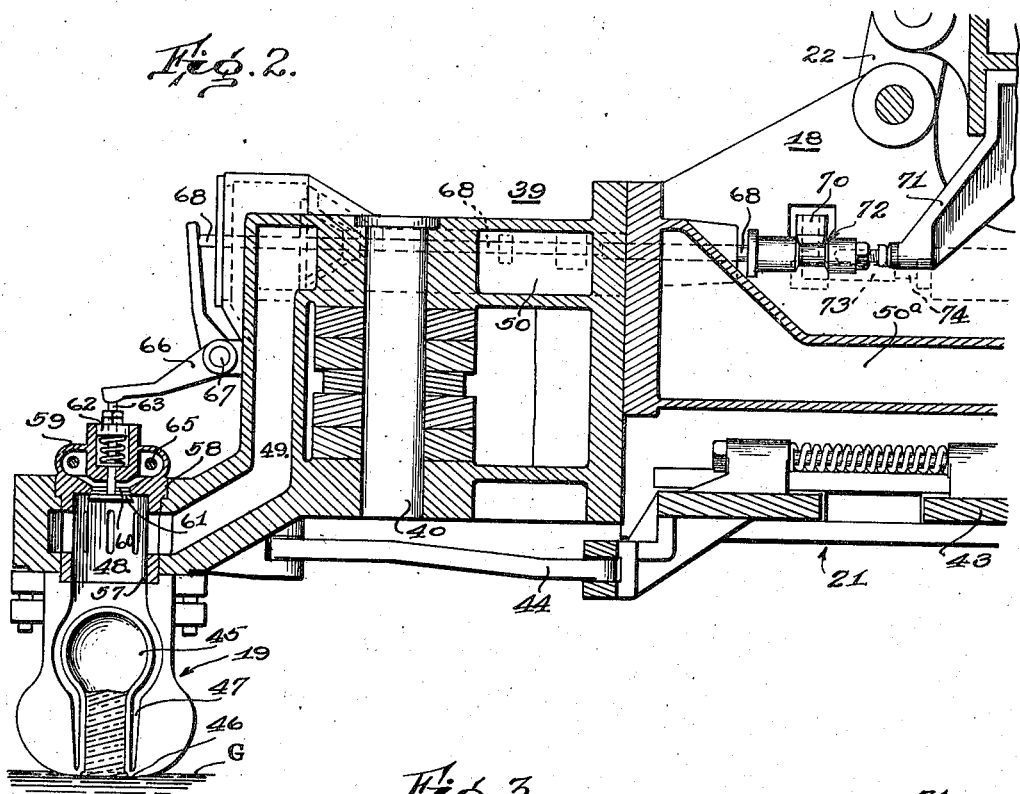
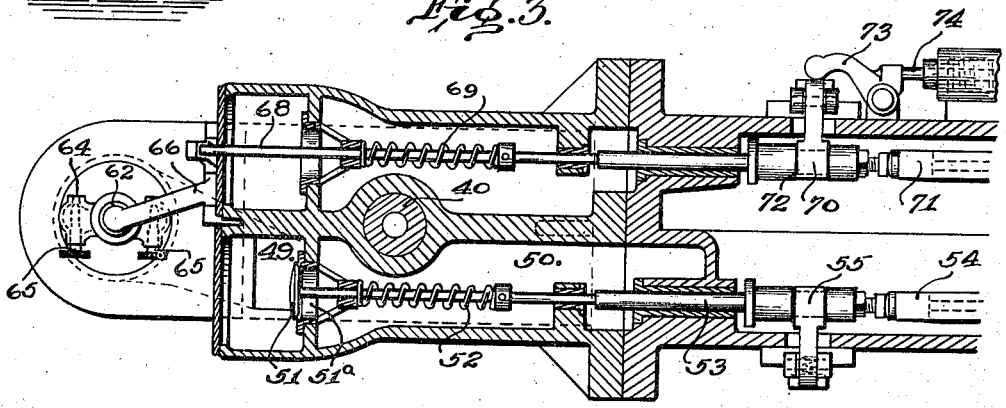

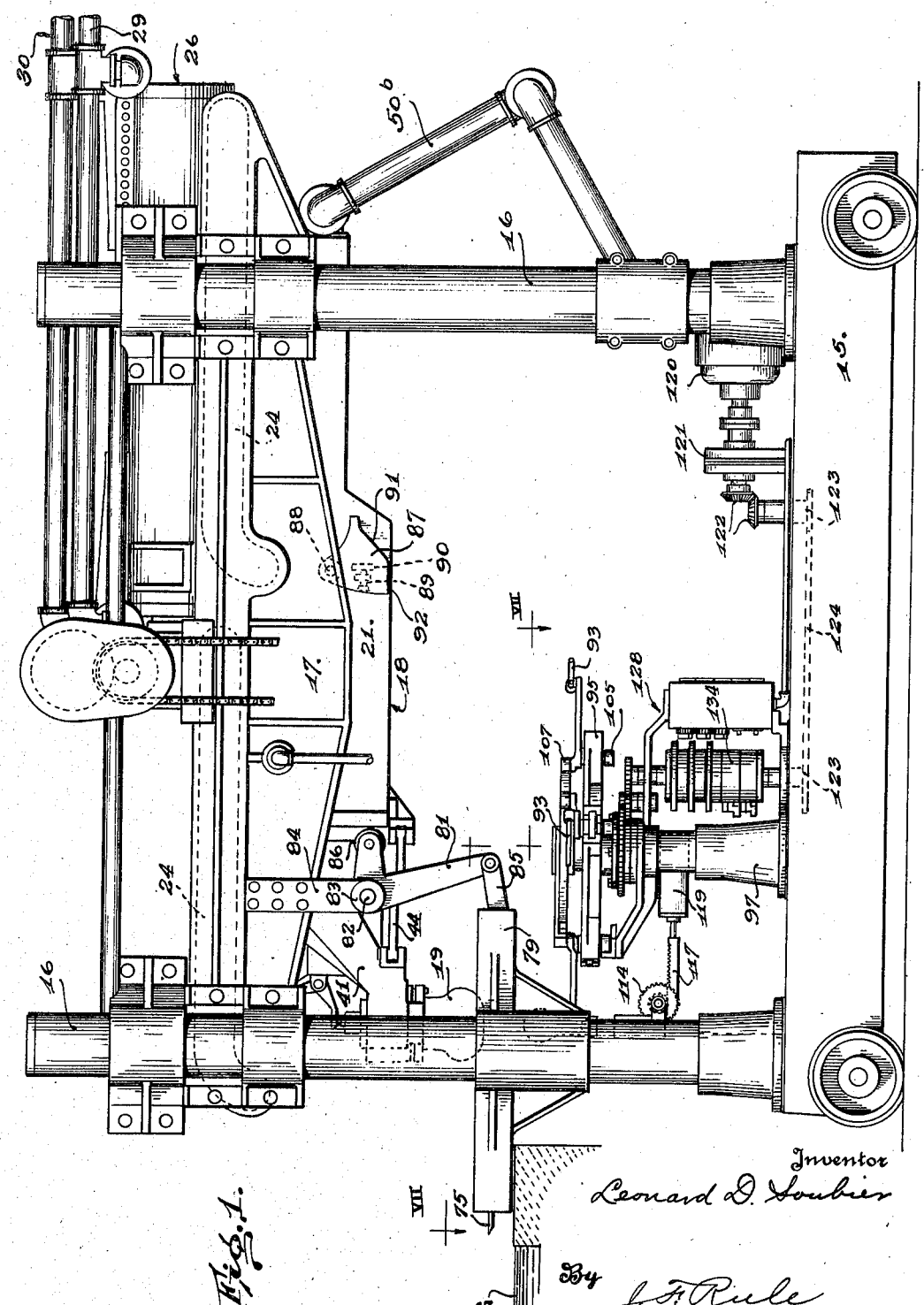

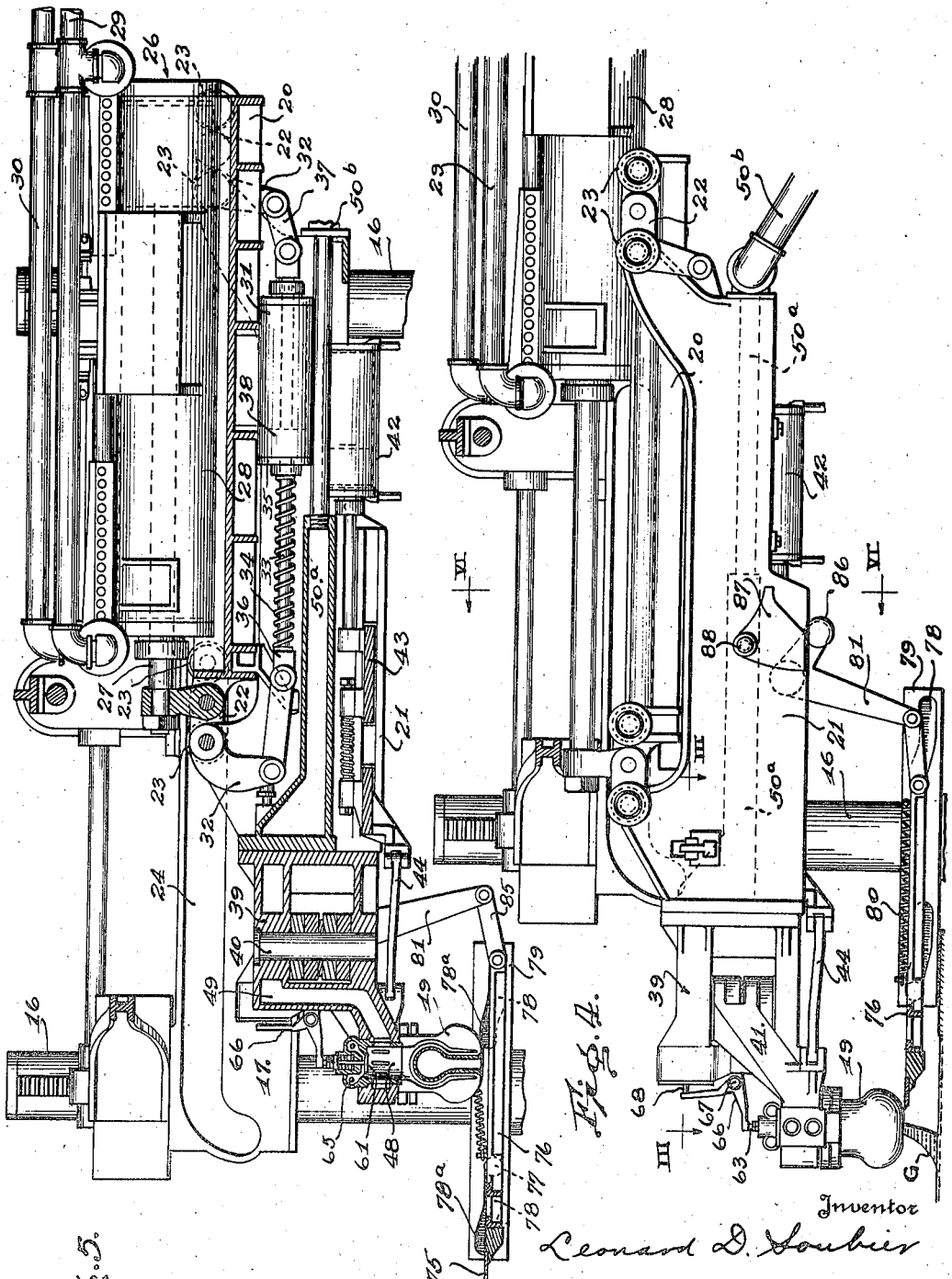

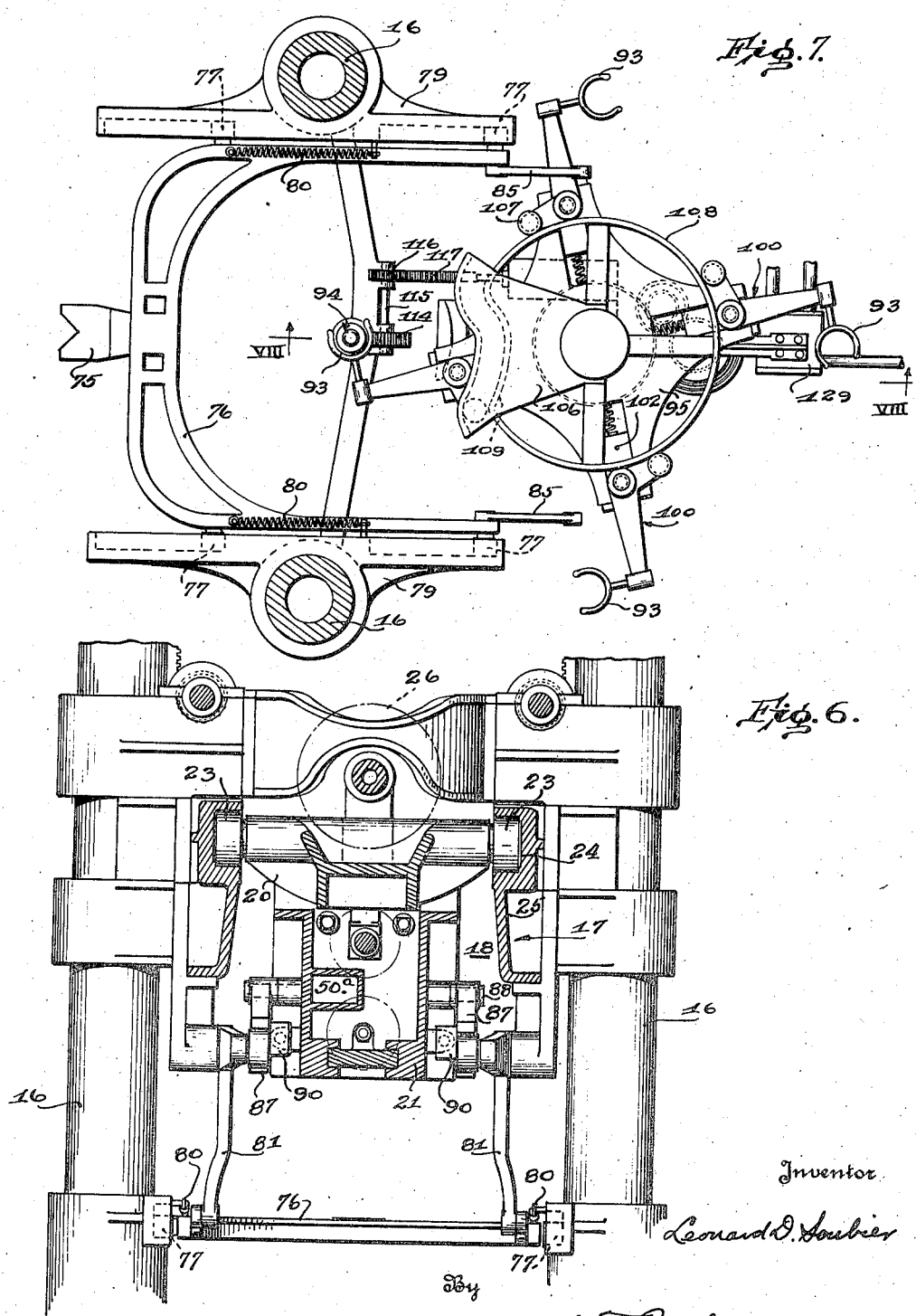

Oct. 5, 1937. L. D. SOUBIER 2,094,624
METHOD OF AND APPARATUS FOR PRODUCING HOLLOW GLASS ARTICLES
Original Filed Feb. 9, 1934 6 Sheets-Sheet 5
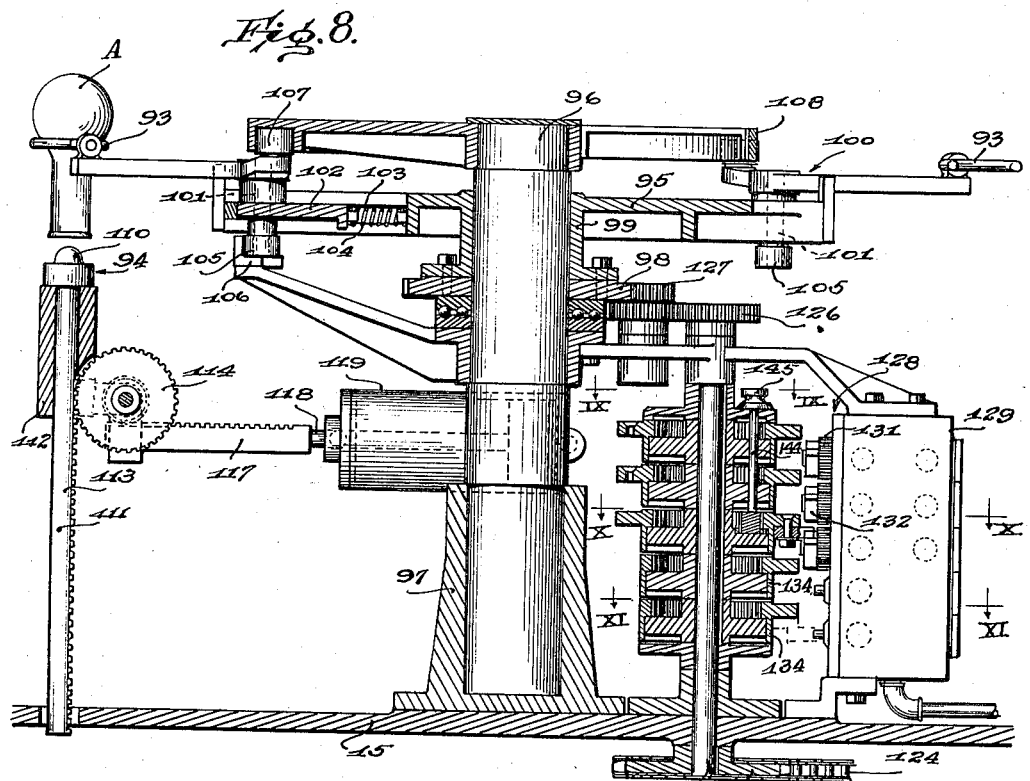

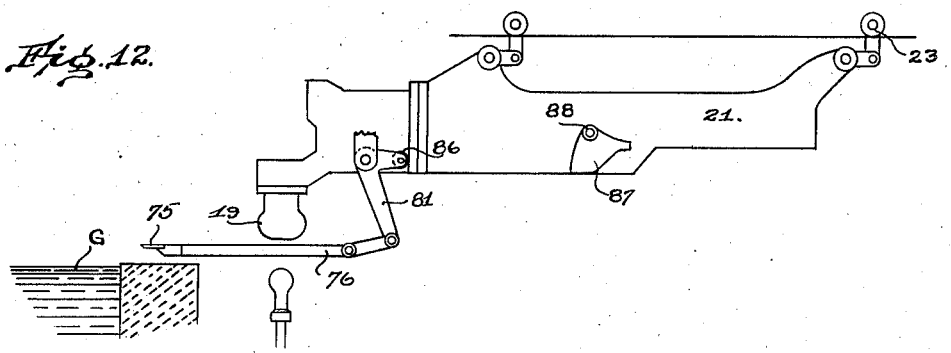
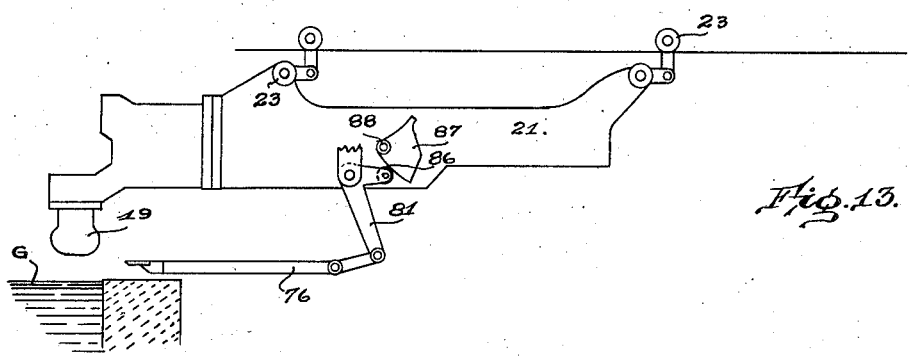
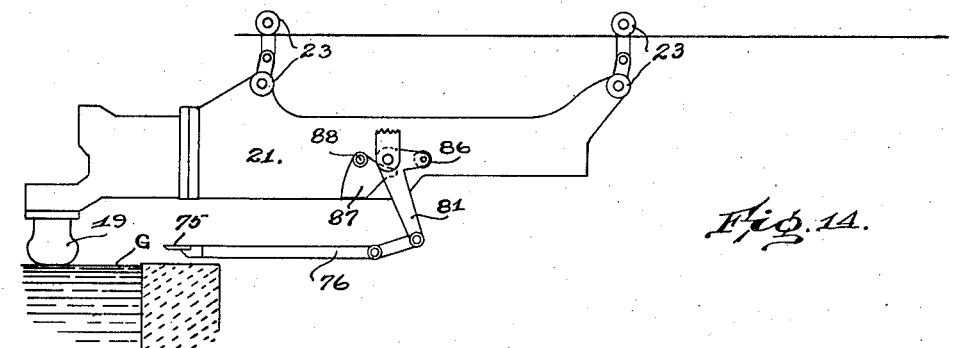
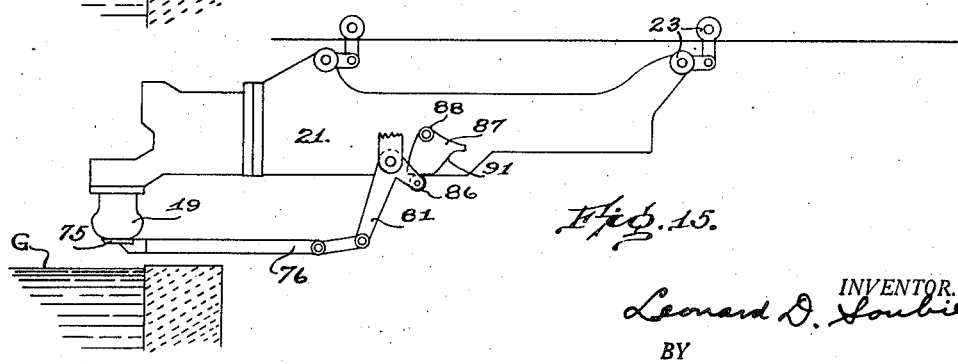

Patented Oct. 5, 1937

2,094,624

UNITED STATES PATENT OFFICE 2,094,624

METHOD OF AND APPARATUS FOR PRODUCING HOLLOW GLASS ARTICLES

Leonard D. Soubier, Toledo, Ohio, assignor to Owens-Illinois Glass Company, a corporation of Ohio Application February 9, 1934, Serial No. 710,417
Renewed January 6, 1937

17 Claims. (Cl. 49—5)

The present invention relates to improvements in methods of and apparatus for producing hollow glass articles, such for example as incandescent lamp bulbs, containers and stoppers.

An object is the provision of a machine for producing hollow glass articles in which a single mold performs the functions of both the conventional blank and finishing molds and wherein vacuum or suction alone is utilized in gathering the glass and expanding it to the shape of the articles.

A further object is the provision of novel means whereby the quantity of glass delivered to the mold with each charging operation may be varied to meet the specific requirements of the article being produced. To this end the invention provides for increasing or decreasing the amount of vacuum applied to the mold cavity.

A still further object is the provision in an apparatus of the above character of means for applying a comparatively low vacuum to the mold cavity during the charging operation and thereafter materially increasing the degree of vacuum for the purpose of effecting rapid expansion of the gathered mold charge into contact with the walls of the mold cavity to completely form a hollow glass article.

It is also an object to provide novel means for regulably controlling the application of vacuum to the mold whereby varying degrees of vacuum may be employed in gathering mold charges of glass and thereby predetermine the quantity of glass delivered to the mold. To this end there is provided means for admitting outside air to the vacuum chamber and mold cavity in regulable quantities prior to and during the charging operation.

Other objects will be in part apparent and in part pointed out hereinafter.

In the drawings:

Fig. 1 is a side elevational view of the machine.

Fig. 2 is a fragmentary vertical sectional view showing the mold in its charge gathering position.

Fig. 3 is a detail sectional view taken substantially along the line III—III of Fig. 4.

Fig. 4 is a fragmentary side elevational view with parts in section showing the mold partially retracted from the gathering position.

Fig. 5 is a vertical central longitudinal sectional view with parts in elevation showing the mold completely retracted and the mold charge expanded.

Fig. 6 is a sectional view taken substantially along the line VI—VI of Fig. 4.

Fig. 7 is a sectional elevational view taken substantially along the line VII—VII of Fig. 1.

Fig. 8 is a vertical sectional elevational view taken substantially along the line VIII—VIII of Fig. 7.

Fig. 9 is a sectional elevational view taken substantially along the line IX—IX of Fig. 8.

Fig. 10 is a sectional elevational view taken substantially along the line X—X of Fig. 8.

Fig. 11 is a sectional elevational view taken substantially along the line XI—XI of Fig. 8.

Figs. 12 to 15 inclusive are diagrammatic views showing successive relative positions of the mold and cut-off knife in part of a cycle of operations.

In more or less general terms the present invention provides for complete formation of a hollow glass article in a suction type mold in which the mold charge is initially placed by the charging operation, the mold cavity necessarily being shaped to correspond to the exterior contour of the article. The final expansion of the glass in the mold is effected by differential pressure applied to the opposite ends of the mold charge. The mold is placed in charging position and sufficient air is exhausted therefrom to partially fill the mold cavity with molten glass and thereafter the glass (mold charge) in the mold is severed from the supply body. Following such separation of the mold charge from the supply body it is expanded to its final shape by the application of differential pressure to the opposite ends of the charge of glass, there being applied to the unfilled portion of the mold cavity a higher vacuum than is initially applied for the charge gathering operation, in order that the final expansion may be rapid and highly effective in causing intimate contact between the glass and metal mold. The application of vacuum is regulably controllable in order that any predetermined quantity of glass may be gathered. While such apparatus may well be embodied in machines of various general designs, I have for illustrative purposes in the present application shown it in connection with a ram type machine of the form disclosed in my copending application Serial Number 663,721 filed March 31, 1933.

The present machine consists of a rectangular wheeled base 15 and four corner posts 16 rising vertically therefrom and supporting at their upper ends a horizontal ram carrier 17 in which a mold supporting ram 18 is mounted for horizontal reciprocating and dipping movements. A mold 19, which incidentally is preferably of the suction gathering type, is suitably mounted at one end of the ram 18 and designed to be brought into charging contact with a supply body of molten glass G at regular time intervals by the aforementioned movements of the ram.

The ram 18 and carrier 17 which constitute a part of the subject matter claimed in the above identified copending application may be briefly described as follows. The ram consists of upper and lower horizontal sections 20 and 21 respectively, pivotally connected by links 22. These links carry rollers 23 which run in opposed horizontal tracks 24 provided in the adjacent faces of a pair of parallel horizontally spaced girders 25 which form a part of the ram carrier 17. These tracks 24 (Figs. 1 and 5) have their forward ends curved downwardly so that the forward pair of rollers 23 may move substantially vertically downward and thereby effect relative vertical movement between the two sections of the ram when the latter is about fully projected. Such relative movement results in lowering of the lower section 21 and therewith the mold 19 which is suspended from the forward end of the lower section. Thus the mold is brought into charging contact with the supply body of molten glass G.

Reciprocation of the ram 18 is obtained by means of an air operated piston motor 26 which is suitably mounted upon the ram carrier 17 above the ram. The piston rod 27 of the motor is connected at its outer end to the front end of the upper ram section 20. Air is supplied to the opposite ends of the motor cylinder 28 in alternation through a supply pipe 29. The air is exhausted from the cylinder to the atmosphere by way of a pipe 30.

Means for counterbalancing the weight of the lower ram section and mold supported thereon and to thereby assist in initial lifting of these elements, after each mold charging operation, consists of a horizontal piston motor 31 disposed between the two sections of the ram and connected to arms 32 which extend downwardly from the forward ends of the links 22. The piston rod 33 extends entirely through the motor cylinder and that part of the rod forwardly of the cylinder is encircled by the coil spring 34, the latter being confined between the cylinder head 35 and a stop 36. The other end of the rod is connected to the arms 32 by means of a link 37. Air under pressure is constantly supplied to the motor cylinder in a fashion to normally hold the piston 38 in its forward position. As a result separation of the two sections of the ram compresses the spring 34 and forces the piston 38 to the opposite end of its cylinder, the combined resistance of the spring and air pressure in said cylinder being sufficient to counterbalance the weight of the lower ram section and mold. Initial application of air under pressure to the ram motor 26 for retracting the ram is preceded by expansion of the spring 34 and forward movement of the piston 38 under pressure of air in the cylinder. As a result the motor and spring materially assist in elevating the lower ram section and mold to the level of the tracks 24.

The mold 19 is mounted upon a holder 39 at the front end of the lower ram section 21, said holder including a vertical hinge pin 40 upon which a pair of mold arms 41 are hinged, said arms carrying the two partible sections of the mold 19. These mold sections are moved toward and away from each other by means including an air motor 42 supported on the lower ram section and connected through a slide 43 and links 44 to said sections.

The mold 19 is provided with a cavity 45 which is identical in contour and dimensions to the article being produced on the machine, said cavity having a charging opening 46 at its lower end adapted for sealing contact with the supply body of molten glass G periodically. Vacuum grooves 47 are formed in the opposed meeting surfaces of the mold sections and communicate by way of a chamber 48 and conduit 49 with a vacuum chamber 50 in the holder 39. This chamber 50 may be connected to any suitable source of vacuum (not shown) by way of a passageway 50$^a$ extending longitudinally in the lower ram section and a jointed pipe 50$^b$.

As indicated heretofore, vacuum is applied to the mold cavity in progressively increasing degrees so that during the charging operation a comparatively low vacuum is created and the cavity is only partially filled with molten glass. Thereafter, following severance of the gathered glass or mold charge from the supply body, a relatively high vacuum is created in the unfilled portion of the cavity with the result that the mold charge is rapidly expanded to form a finished hollow article. Means for regulably controlling the application of vacuum to the cavity for the mold charging operation may well be as follows. A valve (Fig. 3) normally closes an opening 51$^a$ in the vertical wall between the vacuum chamber 50 and conduit 49, said valve adapted to be opened periodically by means brought into operation by separation of the two ram sections. To this end the valve 51 which is normally held closed by a spring 52 is opened by engagement of a push rod 53 (Fig. 3) with a depending arm 54 on the front end of the upper ram section 20. A pivoted latch 55 automatically drops into locking engagement with the push rod 53 when the latter is moved forward sufficiently to open the valve 51. An air operated plunger 56 which is actuated in timed relation to movement of other parts of the machine, operates the latch 55 at the proper time to release the push rod and permit closing of the valve 51 under influence of the spring 52. Opening of the valve 51 only permits application of the greatest available vacuum to the mold cavity 45. This is not desired during charging of the mold and for this reason provision is made whereby outside air in regulable quantities may be admitted to the chamber 48 for reducing the amount of vacuum actually applied to the mold cavity. The construction involved includes a slotted adapter sleeve 57 arranged in a vertical opening 58 at the front end of the holder 39. The upper end of this adapter is closed and provided with a chamber 59, which is connected by means of a normally closed port 60 to the aforementioned chamber 48. A valve 61 is adapted to close said port and is held in closed position by a coil spring 62 encircling a portion of a valve stem 63 which extends upwardly above the top surface of the chamber 59 from the valve. Inlet ports 64 provided with needle valves 65 supply means whereby variable quantities of outside air may be admitted to the chamber 59. By opening the valve 61 the air is allowed to flow into the chamber 48 and thereby reduce the amount of applied vacuum.

Operation of the valve 61 in timed relation to movements of the mold is obtained by means of a bell crank lever 66 pivoted to a horizontal hinge pin 67 at the front end of the holder 39, one arm of the lever constantly engaging the upper end of the valve stem 63 while the other arm contacts the front end of a push rod 68.

This push rod is slidingly supported in the holder 39 and disposed parallel with the push rod 53 (Fig. 3). Normally this push rod 68 is held in its innermost position by means of a coil spring 69 but when the mold is about to reach its charging position said push rod is locked in its foremost position by means of a pivoted latch 70, locking engagement between the latch and push rod being obtained by forward movement of the rod due to contact with a depending arm 71 on the upper ram section and dropping of the latch into an annular groove or channel 72 near one end of the rod. A trip arm 73, operable by means of an air controlled plunger 74 disengages the latch 70 from the push rod at the proper time.

Upon completion of the mold charging operation the ram and mold are retracted for the purpose of removing the mold from contact with the supply body of molten glass, severing the gathered glass from the supply body and placing the mold in position to complete the article being produced. During such retractive movement and before the mold has reached the rim or side wall of the container for the supply body of glass, a cutter 75 operates to sever the gathered mold charge from the supply body. This cutter, which as illustrated, may take the form of a V-shaped knife is mounted upon the forward margin of a horizontal holder 76, said holder being generally U-shaped and mounted for substantially horizontal movement between operative and inoperative positions. In its operative position the knife is projected over the supply body of glass at a higher elevation than when in its inoperative or rest position. The holder and knife are subjected to both horizontal and vertical movements in order that the knife may be lifted as well as moved horizontally periodically and thereby alternately placed in operative and inoperative positions relative to bottom surface of the mold. To this end the holder 76 is provided with rollers 77 running in substantially horizontal channels 78 or ways which are individual thereto and formed in a pair of horizontally spaced bars 79 suitably mounted upon two of the corner posts 16. The forward end portion 78ª of each channel 78 is at a higher elevation than the other end with the result that with sufficient forward movement of the rollers 77, the holder 76 and knife 75 are lifted to the proper elevation for cooperation with the mold 19. Coil springs 80 yieldingly hold the knife in its fully retracted position. Projection of the knife and holder in opposition to the spring is obtained by mechanism operating in response to movement of the ram. This mechanism (Figs. 1, 7, 12, 13, 14, 15) as shown may be as follows:

A pair of bell crank levers 81 arranged at opposite sides of the ram carrier are pivoted on a pair of horizontal hinge pins 82 journaled in bearings 83 at the lower ends of depending arms 84. Links 85 (Figs. 1, 4, and 5) connect the lower ends of the bell crank levers 81 to the adjacent inner end of the knife holder 76. Rollers 86 are mounted upon the other ends of the levers for periodic engagement with stops 87 which are arranged one on each side of the lower section 21 of the ram in such position that at a predetermined point in the retracting movement of the ram, said stops engage the rollers and rock the levers 81 about their pivots and thereby project and elevate the knife. The stops 87 are so supported and of such shape that they do not actuate the knife, knifeholder, or bell crank levers during projection of the ram but with retraction thereof swing the bell crank levers in a clockwise direction about the hinge pins 82 and thereby project and elevate said knife. The construction may be substantially as follows: Each stop takes the form of a substantially rectangular plate pivoted to a horizontal hinge pin 88 in the lower section of the ram 21. Swinging movement of the stop is limited to a counter-clockwise direction by means of an adjustable screw 89 carried by said lower ram section and normally engaging a finger 90 on said stop. The inclined rear portion of the lower surface 91 of each stop 87 is so formed that during retraction of the ram it engages the corresponding roller 86 and causes the lever 81 to swing about its pivot and project and elevate the knife as shown in Figs. 4, 15. The forward portion of the horizontal lower surface 92 of each stop operates to retain the knife 75 at the desired elevation while the mold 19 moves horizontally rearward thereover toward its article finishing position.

After the article has been finished in the mold 19 it is removed by suitable take-out mechanism (Figs. 1, 7, and 8). This take-out mechanism includes an annular series of article supporting forks 93 or similar devices which rotate continuously about a vertical axis in a plane below the ram and cooperates with an intermediate transfer device 94 or elevator, by means of which the articles are moved vertically from the mold 19 to said forks 93.

The forks 93 are carried by a horizontal rotary table 95 mounted for rotation upon a stationary vertical column 96 which rises from a pedestal 97 on the base 15. A spur gear 98 attached to a hub 99 on the lower side of the table 95 is continuously driven in a manner which will be set forth hereinafter. Each fork 93 is carried by a horizontal bell crank lever 100, which is pivoted upon a vertical hinge pin 101 mounted in a slide 102 on said table. This slide 102 is mounted for horizontal radial movement in a slideway 103 and is normally yieldingly held in its outermost position by means of a coil spring 104. A cam roll 105 at the lower end of the hinge pin 101 in cooperation with a short stationary cam 106, determines the path of travel of the corresponding fork 93 at the time said fork receives an article from the elevator 94. This fork 93 is suitably supported at the outer end of the longer of the two arms of the bell crank lever, the shorter arm carrying a cam roll 107 which rides upon a continuous stationary cam 108, a major portion of the latter being of circular form. In proximity to the stationary cam 106, the continuous cam 108 is provided with an angular portion 109 by means of which the bell crank levers are moved backward in a counter clockwise direction. Such movement of the bell crank levers together with radial inward movement under the influence of the cam 106 holds the forks substantially stationary momentarily at the time the articles are transferred from the elevator 94 to said forks.

The elevator 94 includes a plug 110 mounted at the upper end of a vertical carrier 111, said carrier adapted to be reciprocated vertically in a guide 112 and thereby alternately move the plug into and out of supporting engagement with the article A. A rack bar 113 along one side of the carrier 111 runs in mesh with a driven pinion 114. This pinion is mounted upon a shaft 115 which also carries a smaller pinion 116 meshing with a rack bar 117 at the outer end of a piston 118 constituting part of a horizontal piston motor 119. This motor is mounted upon the stationary column 96 and is operated in timed relation with movement of the mold 19 and forks 93.

The fork supporting table is rotated continuously by means of an electric motor 120 or the like (Fig. 1) operating through speed reduction gearing 121, a pair of meshing bevel gears 122, sprockets 123 and a sprocket chain 124, one of said sprocket wheels being attached to the lower end of a vertical shaft 125 which at its upper end supports a pinion 126. This pinion has driving connection through a train of gears 127 with the gear 98 which as stated heretofore, is carried by the table 95.

The various air motors referred to heretofore are adapted to be operated in a predetermined order and to this end a timer 128 (Figs. 1, 8, 9, 10, 11) is provided to regulably control the supply of air under pressure to these motors. A valve box 129 houses a plurality of rotary valves 130 certain of which are connected through pinions 131 to star wheels 132. These star wheels are engaged periodically by radial fingers 133 on timer drums 134. Other valves 135 (Fig. 11) may be of the poppet type, adapted to be opened by means of cam-like fingers 136 on the drums and closed by means of a spring 137. Air under pressure is maintained continuously in the chamber 138 in the valve box 129. The opposite ends of a motor cylinder are connected through a pair of pipes 139 to the valve box. The valve 130 (Fig. 10) has passageways 140 so formed therein that when they are in one position, one passageway connects one of the pipes 139 to the air supply chamber 138, and the other passageway in the valve establishes communication between an exhaust chamber 141 and the other pipe 139 leading to the motor. Periodic movement of the star wheel 132 effects reversal of the valve and consequent reversal of the motor operation. The timer drums 134, which are individual to the valves, are mounted upon the vertical shaft 125 and continuously rotated thereby. Each drum which carries one or more of the trip fingers 133, is provided with an internal ring gear 142 running in mesh with a pinion 143 which is connected through a rod 144 to an adjusting knob 145. In this fashion there is provided means for effecting the various necessary adjustments while the machine is in operation. Additional adjustment is obtainable as a result of the bolt and slot connection between the radial fingers 133 and flanges 146 on said drums.

The operation may be substantially as follows. Assuming that the machine is in the position shown in Figs. 1 and 12, the ram motor 26 is operated to project the ram for the purpose of bringing the charging opening of the mold 19 into sealing contact with the glass "G". At about the time the ram reaches its extreme forward position the lower section 21 drops away from the upper section 20, allowing the mold to contact the surface of the supply body of glass. During this movement of the ram the stops 87 (Figs. 1, 12 and 13) ride freely over the rollers 86 of the knife operating mechanism thereby permitting the knife to remain in an inoperative position during the mold charging operation. Substantially at the time the mold is brought into contact with the glass the vacuum valve 51 is opened and the valve 61 for admitting air to the vacuum chamber is likewise opened. Thus a comparatively low regulable amount of vacuum may be applied to the mold cavity 45 with the result that the volume or quantity of glass actually drawn into the mold cavity will be considerably less than the actual capacity of the mold. While this vacuum is maintained the ram is retracted, thereby removing the mold from contact with the glass and returning it to its original position. During such retractive movement the stops 87 again engage the rollers 86 of the knife operating mechanism. Because these stops cannot move in a clockwise direction, the rollers must of necessity follow the path defined by the lower surface of said stops. As a result the bell crank levers 81 are rocked in a clockwise direction, causing projection of the knife 75 and lifting thereof to an operative position over the glass and in the horizontal plane of travel of the bottom of the mold. Thus with continued retractive movement of the mold the excess glass is sheared from that portion in the mold cavity. After the mold has reached its original position the air control valve 61 is closed by automatic lifting of the latch 70 which allows the spring 62 to expand and quickly lift said valve 61. By this procedure the amount of vacuum applied to the mold cavity is greatly and very quickly increased and as a result the soft center core of glass is moved upwardly and the mold charge is transformed into a hollow article having an exterior surface conforming to the shape of the mold cavity. Following this expanding operation the latch 55 may be lifted to permit closing of the vacuum valve 51. The elevating device 94 is then brought into supporting engagement with the open lower end of the article and the mold is opened, leaving the article resting upon the plug 110. By operation of the motor 119 (Fig. 8) the plug is lowered and due to the synchronized movements of the plug and forks, one of the latter is brought into supporting engagement with the article during and substantially at the end of its downward movement with said plug. These forks which as stated heretofore move continuously, carry the articles to a point at which an operator may transfer them to a suitable conveyor which in turn transports them to an annealing leer (not shown).

Modifications may be resorted to within the spirit and scope of the appended claims.

What I claim is:

1. The method which consists in bringing the charging opening of a mold into contact with a supply body of molten glass, partially exhausting air from the mold to thereby partially fill it with molten glass, severing the glass in the mold from the supply body and thereafter completing the exhaustion of air from the mold at a higher speed than the initial exhausting operation and thereby expanding the glass to the shape of a finished article.

2. The method of completely forming a hollow glass article in a single mold cavity having a charging opening at one end, which consists in bringing the opening into sealing contact with a supply body of molten glass, partially vacuumizing the cavity to deliver a mold charge of molten glass thereto, and thereafter by the application of a higher vacuum to the cavity than that employed in the charging operation causing the mold charge to expand into contact with the walls of the cavity and take the form of the finished article.

3. The method which consists in partially filling a mold cavity with molten glass by partially vacuumizing the cavity, exposing an end of the glass in the mold to the atmosphere and substantially simultaneously therewith applying higher vacuum to the cavity than that employed in initially placing the glass therein to thereby completely form a hollow glass article.

4. The method which consists in partially filling a mold cavity with molten glass by means of vacuum and expanding the glass in the mold by the application of a higher degree of vacuum than that employed in placing the glass in the mold.

5. The method of forming a hollow glass article in a mold which consists in partially filling the mold cavity with molten glass and expanding the glass therein by a succession of applications of regulable progressively increasing degrees of vacuum.

6. A machine for producing a hollow glass article comprising a mold having a cavity of the same contour and dimensions as the exterior surface of the finished article and a charging opening at one end of said cavity, means for bringing the mold to a position over a supply body of molten glass with the charging opening in sealing contact with the latter, means for applying a predetermined degree of vacuum to the cavity and thereby partially filling it with glass, means for severing the glass in the cavity from the supply body, and means for then applying a higher degree of vacuum to the cavity than that employed in gathering the glass and thereby expanding the glass to the shape of the article.

7. A glassware forming machine comprising a mold having a cavity extending lengthwise thereof and a charging opening at one end, means for bringing the charging opening into sealing contact with a mass of molten glass, means for applying sufficient vacuum to the cavity to partially fill it with molten glass, means for severing the gathered glass from said mass of molten glass, and means for then effecting application of higher vacuum to the cavity than that employed in charging the mold to thereby distribute the glass over the walls of the cavity and complete the formation of a hollow article.

8. In a machine for producing a hollow glass article, the combination of a mold formed with a cavity of the same shape and dimensions as the exterior of the article to be produced and having a charging opening at one end, a vacuum chamber communicating with the other end of the mold cavity, means for exhausting the air from the chamber and cavity to thereby partially fill the mold with glass and thereafter finally shape the glass, regulable means for introducing outside air into said chamber to thereby reduce the effectiveness of the vacuum during said partial filling of the mold only, means for moving the mold into and out of a position in which the charging opening has sealing contact with a supply body of molten glass, and means for severing glass delivered to the mold from the supply body.

9. In a machine for producing a hollow glass article, the combination of a mold formed with a cavity of the same shape and dimensions as the exterior of the article to be produced and having a charging opening at one end, suction means for exhausting air from the cavity to thereby partially fill it with glass and thereafter finally shape the glass, including a vacuum chamber communicating with the other end of the mold cavity, a valve for regulating the application of vacuum to the chamber and cavity, regulable automatic means between said valve and cavity operable to admit outside air to the chamber and thereby control the amount of vacuum applied to the cavity during filling thereof, means for moving the mold into and out of a position in which the charging opening has sealing contact with a supply body of molten glass, and means for severing a gathered mold charge from the supply body.

10. In a machine for producing a hollow glass article the combination of a mold formed with a cavity of the same shape and dimensions as the article to be produced and having a charging opening at one end, means for moving the mold in a fashion to periodically bring the charging opening into sealing contact with a supply body of molten glass, a suction means for exhausting air from the cavity to thereby partially fill it with glass and thereafter finally shape the glass, including a vacuum chamber communicating with the mold cavity, a valve for regulating the application of vacuum to said chamber and cavity, means for introducing outside air into said chamber between the valve and cavity to thereby reduce the effectiveness of the vacuum during the charging operation only, said last named means including a valved opening for establishing communication between the chamber and the atmosphere, automatic means for opening and closing the air control valve in timed relation with movement of the mold relative to the supply body of glass, and means for severing gathered glass from said supply body.

11. In a machine for producing a hollow glass article, the combination of a mold formed with a cavity of the same shape and dimensions as the exterior of the article to be produced and having a charging opening at one end, means for moving the mold into and out of a position in which the charging opening has sealing contact with a supply body of molten glass, means for effecting a succession of applications of progressively increasing degrees of vacuum to the cavity whereby the latter is partially filled with glass with the first application of vacuum and the glass expanded to its final shape thereafter, and means for severing glass in the mold from the supply body.

12. In a machine for producing a hollow glass article, the combination of a partible mold formed with a cavity of the same shape and dimensions as the exterior of the article to be produced and having a charging opening at one end, means for applying vacuum to the mold cavity to partially fill it with molten glass and thereafter expand the glass to its final shape including a vacuum chamber connected to said cavity, means for admitting air in regulable quantities to the vacuum chamber periodically to reduce the effectiveness of the vacuum during the filling operation sufficiently to effect only a partial filling of the cavity and cutting off the air immediately following the filling operation, means for moving the mold into and out of contact with a supply body of molten glass, and means for severing glass in the mold from said supply body.

13. In a machine for producing a hollow glass article, the combination of a mold formed with a cavity of the same shape and dimensions as the exterior of the article to be produced and having a charging opening at one end, means for moving the mold into and out of a position in which the charging opening has sealing contact with a supply body of molten glass, a vacuum chamber communicating with the mold cavity, an air chamber having an inlet port opening to the atmosphere and an outlet port opening into said vacuum chamber, valves for said ports, means for opening the valve in the outlet port during each charging operation to admit air to the cavity and thereby reduce the effectiveness of the vacuum and closing said valve after the charging operation, and charge severing mechanism for separating glass in the mold from said supply body.

14. In combination, a machine for forming glass articles, including a partible mold having an open lower end, means for bringing the mold with a finished article therein to an article discharging position, means for opening and closing the mold, a vertically movable elevator, means for bringing the elevator into supporting engagement with an article in the mold prior to opening the latter and then lowering the article away from the mold, an annular series of article holders mounted for continuous rotation about a vertical axis in a horizontal path intersecting the vertical path of movement of the elevator, and means whereby the holders are momentarily held substantially in the path of travel of the elevator during downward movement of the latter.

15. In combination, a glassware forming machine including a mold having an open lower end, means for opening and closing the mold, means for bringing the mold with a finished article of glassware therein to a discharging position, take-out mechanism for removing the article from the mold including a series of fork-like holders rotatable in a closed horizontal path below the mold, means operating in timed relation with movement of the mold and holders for transferring the article from the mold to one of said holders, and means for retarding normal advancing movement of the holders one at a time during transfer of the articles to them from the mold.

16. In combination, a glassware forming machine including a mold having an open lower end, means for opening and closing the mold, means for bringing the mold with a finished article of glassware therein to a discharging position, take-out mechanism for removing the article from the mold including a series of holders rotatable in a closed horizontal path below the mold, means operating in timed relation with movement of the mold and holders for transferring the article from the mold to one of said holders, said last named means including a vertically travelling elevator, and means for so operating said elevator that it is brought into supporting engagement with an article in the mold by moving it upwardly and during downward movement automatically transfers the article to one of the holders.

17. The method which consists in bringing the charging opening of a mold into contact with a supply body of molten glass, effecting communication between the mold and a source of supply of vacuum, introducing outside air into the mold to momentarily reduce the effectiveness of the vacuum and thereby partially fill the mold with molten glass, severing the gathered glass from the supply body and discontinuing the introduction of outside air to thereby permit application of the full force of the vacuum in expanding the glass to the shape of the mold.

LEONARD D. SOUBIER.